May 29, 1962 R. J. MEIJER 3,036,427
SPEED REGULATOR FOR A HOT GAS RECIPROCATING MACHINE
Filed Dec. 23, 1959 2 Sheets-Sheet 1

INVENTOR
ROELF J. MEIJER.
BY
AGENT

May 29, 1962 R. J. MEIJER 3,036,427
SPEED REGULATOR FOR A HOT GAS RECIPROCATING MACHINE
Filed Dec. 23, 1959 2 Sheets-Sheet 2

INVENTOR.
ROELF JAN MEIJER
BY
AGENT.

3,036,427
SPEED REGULATOR FOR A HOT GAS
RECIPROCATING MACHINE
Roelf Jan Meijer, Eindhoven, Netherlands, assignor to North American Philips Company, Inc., New York, N.Y., a corporation of Delaware
Filed Dec. 23, 1959, Ser. No. 861,674
Claims priority, application Netherlands Feb. 12, 1959
8 Claims. (Cl. 60—24)

A hot-gas reciprocating machine comprising means for controlling the weight of the medium operating in a working space of the machine is known. With these machines the working space concerned is constantly in communication via a duct with a fixed gas resistance with an auxiliary space, which contains the same working medium. With this machine the duct with the fixed gas resistance is employed to compensate in a simple manner the unavoidable gas leakages. In order to minimize the losses in useful effect of the machine due to the open communication between the working space and the auxiliary space, the value of the resistance in the said duct of this machine is chosen so that the loss in useful effect is not more than 10%, preferably not more than 5% of the power of the machine. With this machine the duct comprises a member by which the gas resistance in this duct can be adjusted. However, this member serves only as an adjusting means for the resistance in this duct and is therefore not actuated in the normal operation of the machine.

A hot-gas reciprocating machine is to be understood to mean a hot-gas reciprocating engine, a refrigerator and a heat pump. With all these machines a gaseous working medium is periodically reciprocating between a hot and a cold space by means of piston-like bodies via a regenerator.

During the operation of this kind of machines it is very important to have means available with the aid of which the machine power can be simply and rapidly controlled. As stated above, it is already known to achieve this by controlling the weight of the medium performing the thermodynamic cycle in one or more of the working spaces of the machine. If air is used as a working medium, it is no predominating objection to let escape medium which is not required at a given instant, particularly, when the pressure of the medium in the machine does not exhibit excessive differences with the atmospheric pressure. If the difference in pressure is high and, particularly, if not air but a different gas is used as a working medium in the machine, the method of allowing working medium to escape into the open air is not recommendable since it would involve important losses. A further disadvantage of such a control-method resides in that a fairly large compressor is to be available to restore rapidly the pressure level in a working space. The present invention has for its object to obviate the said disadvantage.

The hot-gas reciprocating machine of the kind set forth has the feature that the working space concerned can communicate with a space containing a working medium not only via the duct with the fixed gas resistance but also through a duct with a variable gas resistance, the duct having the variable gas resistance being provided with a closing member, which is capable of occupying not only a closed position and, if desired, a plurality of intermediate positions, but also an entirely open position, in which latter position the resistance in the duct concerned is at least five times lower than the gas resistance in the constantly open duct comprising the fixed gas resistance.

By opening the closing member in the duct with the variable gas resistance a decrease in the useful effect of the machine can thus be obtained directly, whilst no loss of medium occurs. If, for example, helium or hydrogen are used as a working medium, it is an important advantage that no loss of medium occurs.

As a rule, the duct having the fixed gas resistance will be formed by an open conduit having a small bore area connecting the auxiliary space with the working space. If the space between the outer side of the machine piston and the inner side of the cylinder wall has a very accurately reproduceable value, which may be the case, for example, if the piston has a smooth outer surface and moves in the cylinder without piston rings, the said space may be used also as a duct with a fixed gas resistance between the working space and the space below the piston, the latter space serving as an auxiliary space. In a different embodiment the two ducts are housed in a single conduit, provision being made of a closing member which can close this conduit to a passage which is equal to the passage required for the duct with the fixed gas resistance.

If the hot-gas reciprocating machine according to the invention is a hot-gas reciprocating engine and if the working space concerned is caused to communicate with the same auxiliary space via the duct with the fixed gas resistance and via the duct with the variable gas resistance, an extremely simple construction of the engine according to the invention is obtained, which is suitable for use, for example, as an outboard engine. As a rule, it will be sufficient for the closing member in the duct with the variable gas resistance to have only two positions, i.e. one position in which the duct concerned is completely closed, so that the engine supplies its maximum power, and a further position in which the duct is completely open and the engine thus supplies the no-load power. As a matter of course, the closing member may be adapted to occupy intermediate positions. If the engine of this embodiment supplies the no-load power and if the closing member in the duct concerned is closed again, the engine will immediately supply again the maximum power.

In one embodiment of the hot-gas reciprocating machine according to the invention comprising two or more working spaces the duct having the variable gas resistance is located between two working spaces of the machine, in which the thermodynamic cycle have a given phase difference.

A further embodiment of the invention used for a hot-gas reciprocating machine comprising a container for working medium, a compressor, a medium supply member between the container and a working space, a working outlet member between this working space and the suction side of the compressor and a regulator, has the feature that the regulator actuates the medium outlet member and the closing member with the variable gas resistance in such an order of succession in time that, when the prescribed operational condition of the machine is transgressed, the regulator first opens the medium outlet member and subsequently the closing member in the duct with the variable gas resistance, whereas when the new prescribed operational condition of the machine is attained, the regulator first closes the closing member in the duct with the variable gas resistance and subsequently the medium outlet member.

This embodiment has the advantage that a rapid control in both directions is possible, whilst in spite thereof the control-compressor may be of fairly small size.

An advantageous embodiment is obtained by coupling rigidly with each other the medium outlet member and the closing member in the duct with the variable gas resistance. By a suitable form of the part constituting the connection between the medium outlet member and the closing member in the duct with the variable gas resistance the prescribed order of succession in the actuation of these closing members can be ensured in a simple manner.

With the hot-gas reciprocating machine according to the invention it is furthermore advisable to provide a regulator for hydraulic control of the medium supply member and the medium outlet member.

The invention will be described more fully with reference to the drawings in which—

Figure 1:
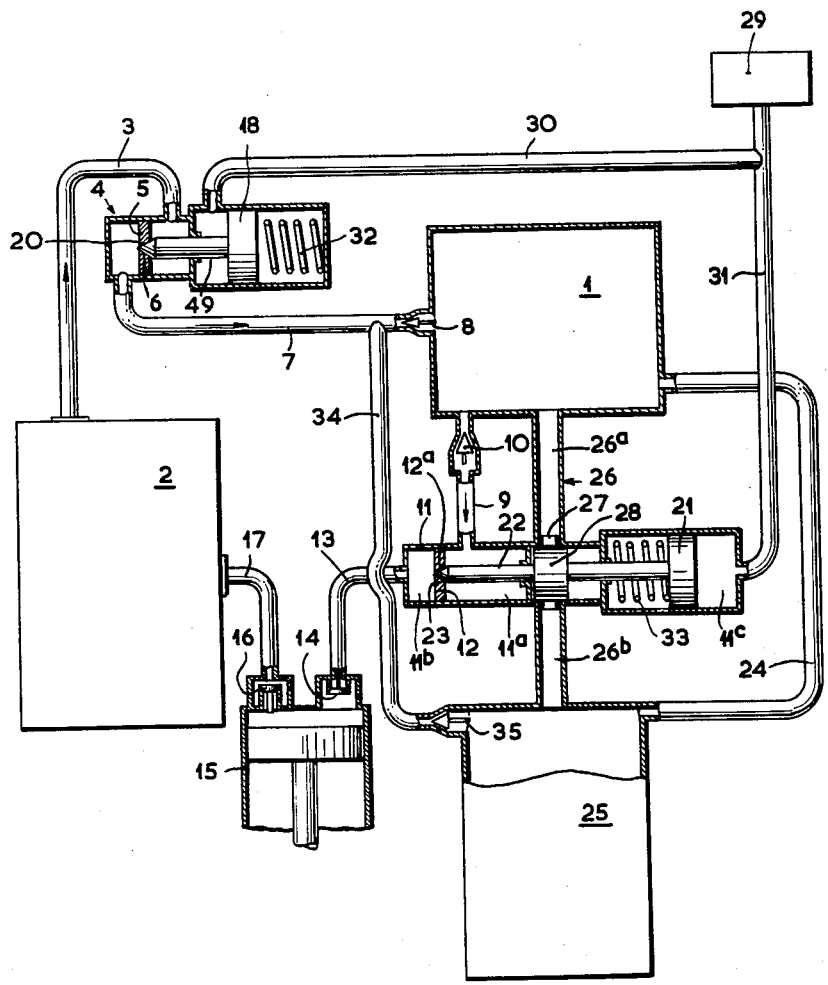
FIG. 1 is a schematic representation of one embodiment of a control system for a hot gas reciprocating machine.
Figure 2:
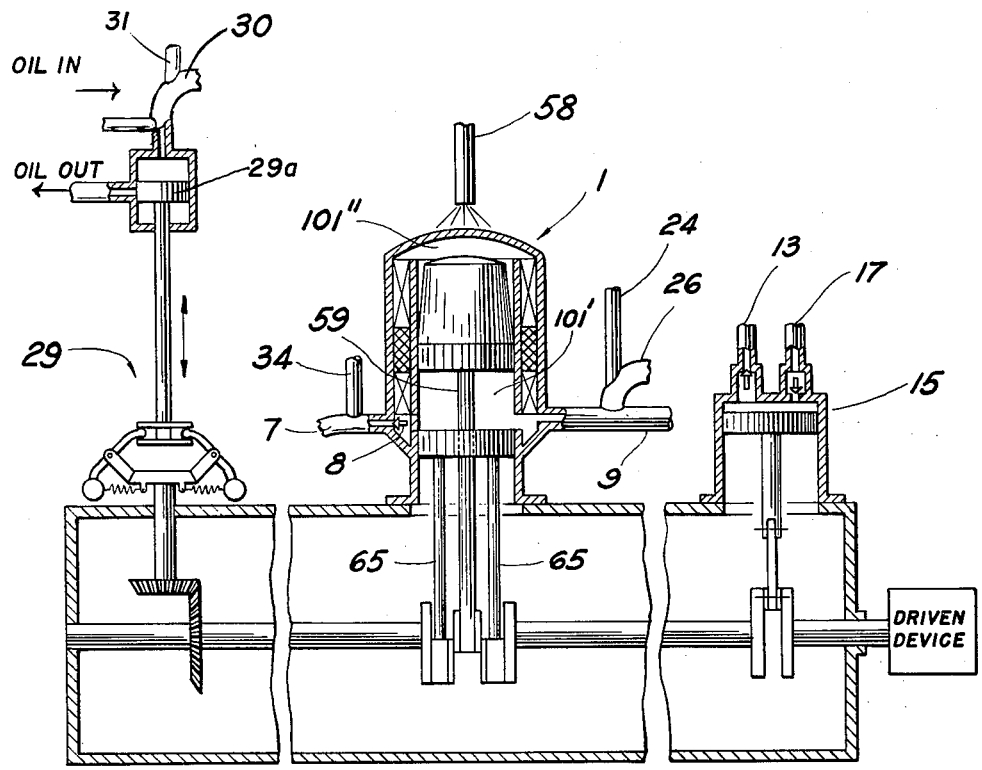
FIG. 2 is a somewhat detailed schematic representation of the working space or cylinder of a known hot gas machine and associated accessories according to the invention.

Referring to FIGS. 1 and 2, numeral 1 designates a cylinder or plurality of cylinder defining the working space of the engine. In the manner usually employed in hot-gas engines the pistons and the displacers reciprocate in the said space or spaces. Reference numeral 2 designates a container for a working medium, for example, hydrogen. Via the duct 3 the container 2 communicates with a space $4^a$ of a cylindrical body 4. In this body is provided a partition 5, which has a central bore 6. This partition 5 separates the spaces $4^a$ and $4^b$ in the cylindrical body 4. With the space $4^b$ communicates a duct 7, which communicates with the working space 1 via the check valve 8.

Via a conduct 9, which includes a check valve 10, the working space of cylinder 1 communicates with the space $11^a$ of the cylindrical body 11. The working space 1 as seen in FIG. 2 comprises cold space $101'$ and hot space $101''$. In the space of the cylindrical body 11 is provided a partition 12, which has a central bore $12^a$. On the other side of this partition the cylindrical body 11 has a space $11^b$, which communicates with a duct 13. Therewith communicates the suction valve 14 of the control-compressor 15. This compressor has, furthermore a pressure valve 16, which leads to the duct 17, which opens out in the container 2.

In the prolongation of the cylindrical body 4 is movable a piston-like body 18, which is provided with a pin-shaped extension 19. The conical end 20 thereof bears in the central bore 6 of the partition 5 and thus constitutes, in the urged state, a gas-tight closure. This conical end 20 constitutes the medium supply member. In a similar manner, in the prolongation of the cylindrical body 11 is movable a piston-like body 21, which has a pin-shaped extension 22, of which the conical end 23 bears in the central bore $12^a$ of the partition 12. The conical end 23 of the pin 22 constitutes the medium outlet member.

The working space of cylinder 1 is in constant open communication through a duct 24 with an auxiliary space 25, which contains a working medium. The gas resistance in the duct 24 is chosen, on purpose, to be high; the engine power, at an average engine load is thus effected for not more than 10% preferably not more than 5%. The space 25, owing to the communication duct 24, will exhibit a pressure of the working medium which is always substantially equal to the prevailing average pressure in the working space of cylinder 1. The pressure in the auxiliary space 25 therefore does not follow the pressure variations occurring in each cycle in the working space 1. However, if the average pressure in the working space rises or drops at an increase or a decrease in engine power, this pressure variation will occur after a short time also in the auxiliary space 25 owing to the presence of the duct 24.

The working space 1 communicates with the auxiliary space 25 not only via the duct 24 with the fixed gas resistance but also via the duct 26 with the variable gas resistance. The duct portions $26^a$ and $26^b$ open out in a sleeve 27, which surrounds a cylindrical closing member 28. This closing member 28 is supported by the stud-shaped extension 22 and is therefore rigidly connected with the medium outlet member 23.

By means of the proportioning of the medium outlet member 23 and of the cylindrical closing member 28 and by means of the disposition of these parts in their direction of movement relative to the bore $12^a$ in the partition 12 and of the cylindrical member 28 relative to the openings in the sleeve 27 it is ensured that, when the piston-like body 21 moves to the right in a manner to be described hereinafter, first the medium outlet member 23 is set free of the central bore $12^a$ in the partition 12, so that the medium outlet member is opened and subsequently, upon a further movement, the cylindrical closing member 28 leaves partly free the openings in the sleeve 27, so that an open communication, first with a restricted passage, is established between the working space of cylinder 1 and the auxiliary space 25 via the duct 26.

Reference numeral 29 designates an oil-pressure regulator, which is connected with a centrifugal regulator coupled with the engine shaft. The said regulator 29 is constructed so that, upon a decrease in the speed of the engine, a higher oil pressure is indicated by the regulator 29. The regulator 29 is connected via a duct 30 with a closed part $4^c$ of the cylinder 4 and via a duct 31 with a closed part $11^c$ of the cylindrical body 11. On the side of the piston 18 remote from the space $4^c$ a pressure spring 32 is operative, whereas a pressure spring 33 acts upon the side of the piston-like body 21 remote from the space $11^c$. At any instant the positions of the piston-like body 18 and of the piston-like body 21 are determined by the instantaneous equilibrium between the oil pressure in the duct 30 and the force exerted by the spring 32 on the piston 18, or between the oil pressure in the duct 31 and the force exerted by the spring 33 on the piston 21.

The arrangement operates as follows: When the engine operates at the prescribed speed at a load which is lower than the maximum load, the medium supply member 20, the medium outlet member 23 and the closing member 28 in the duct 26 are closed. In this position the spring 32 holds the medium supply member 20 closed against the action of the oil pressure 30, which pressure holds the medium outlet member 23 and the closing member 28 closed against the action of the spring 33. Under this condition a pressure of $p_1$, on an average, prevails in the working space. Owing to the duct 24 with the fixed gas resistance substantially the same mean pressure $p_1$ prevails in the auxiliary space 25. The piston of the control-compressor 15 moves with the engine shaft in an unloaded state. In the container 2 always prevails a pressure which exceeds the minimum pressure prevailing in the cycle, when the engine supplies maximum power.

When the load of the engine is raised, so that the speed of the engine decreases, the oil pressure in the regulator 29 will increase. Thus the oil pressure urges the medium supply member 20 into the open position against the action of the spring 32; via the duct 3, the opened medium supply member and the duct 7 an amount of medium is supplied to the working space of cylinder 1. The mean pressure in the cycle then rises to a mean value of $p_2$, which pressure is attained after a short time also in the auxiliary space 25. Thus the speed of the engine, which had been reduced by the load increase, regains the initial value, so that the oil pressure in the regulator 29 drops slightly and the spring 32 is again capable of closing the medium supply member 20. Owing to the temporary increase in oil pressure in the regulator 29 the medium outlet member 23 was urged more strongly onto its seat during this control.

Conversely, a decrease in load of the engine will involve an increase in engine speed and a corresponding decrease in the oil pressure in the regulator 29 and hence in the ducts 30 and 31. Thus the medium supply member 20 is urged more strongly onto its seat. However, the spring 33 will be capable of detending, so that the medium outlet member 23 is opened. Thus an amount of medium will flow out of the working space towards the compressor 15 via the duct 9, the medium outlet member 23 and the duct 13. The compressor will transfer the medium, practically without pumping action, into the container 2 as long as the pressure in the container 2 is lower than the pressure of the flowing medium. However, if the whole load of the engine disappears so that the engine is likely to attain an inadmissibly high speed, the compressor had to be provided with such a large size, if no further precautions were taken, that it would be capable of transferring the medium leaving the working space to the container 2 within a minimum period of time. Such large compressors involve, however, an unnecessarily heavy load of the engine, if out of use. Moreover, these compressors take much space.

This disadvantage is obviated by providing the duct 26 with the cylindrical closing member 28. When the maximum pressure in the cycle is approximately equal to the pressure in the container 2 by opening the outlet member 23, the compressor 15 starts pumping, thus urging an amount of medium via the pressure valve 16 in the duct 17 into the container 2. If the pressure decrease of the medium in the cycle were not yet sufficient to allow the engine to attain its prescribed speed, the spring 33 can detend further owing to the further decrease in oil pressure in the regulator 29 occurring as a consequence of the yet excessive speed of the engine shaft. Thus, the cylindrical slide 28 opens the gates of the sleeve 27 to a greater or smaller extent. A leak is thus formed in the thermodynamic process performed in the working space, so that the power produced in the engine drops strongly, the speed being thus strongly reduced. The rate of flow through fully opened sleeve 27 is at least five times the rate of flow through duct 24 of fixed flow resistance.

At a further decrease in speed, and hence at an increase in pressure in the regulator 29, first the cylindrical closing member 28 is closed and then the medium outlet member 23. When the cylindrical closing member 28 is closed, the pressure in the auxiliary space 25 follows the mean pressure of the cycle performed in the working space. This is due to the existing open communication between the working space and the auxiliary space 25 via the duct 24 with the fixed gas resistance.

In a so-called displacer-piston engine the side of the piston not taking part in the hot-gas engine process may constitute a boundary of the auxiliary space 25, so that an important decrease in the bearing pressure of the engine is obtained.

In the embodiment shown the speed of the engine is considered to characterize the desired operational state of the engine. As a matter of course, other magnitudes may be chosen to this end; it may be imagined, for example that, with given embodiments of an electric dynamo coupled with a hot-gas engine, the terminal voltage of this dynamo is employed as an oil-pressure regulator.

With a multi-cylinder engine, in which cycles having relatively different phases are performed, the communication duct 26 with the variable gas resistance may be arranged advantageously between two working spaces, in which hot-gas engine processes with relatively different phases are performed.

The invention may, as a matter of course, be employed also advantageously with refrigerators.

If with a hot-gas engine only a control-system capable of adjusting full load and no load is required, in principle only the working space of cylinder 1, the auxiliary space 25, the communication duct 24 with the fixed gas resistance between the working space and the auxiliary space 25 and the communication duct 26 between the working space and the auxiliary space and including a closing member having only one open position and one closed position suffice. Of course, intermediate positions of the closing member may be provided.

The embodiment shown comprises furthermore a communication duct 34 between the auxiliary space 25 and the medium supply duct 7. If at a given instant the mean pressure in the working space and hence in the auxiliary space 25 is much lower than that in the container 2, an amount of medium flows out of the container 2 via the duct 3, the medium supply member 20 and the duct 7, through the duct 34 into the auxiliary space 25 via the check valve 35. This provides a possibility of a rapid control in an upward sense.

Referring to FIG. 2 it will be seen that the oil pressure regulator 29 and compressor 15 are each driven from a common shaft to which torque is supplied to the displacer piston by way of rod 59 and torque applied to the shaft by the so called working piston by a pair of rods 65, 65 in a known manner. The device to be driven is likewise connected with this same shaft and may comprise a generator, marine screw propeller or the like.

Referring more particularly to FIG. 2 it will be seen that when the load on the engine decreases, the speed increases throwing the fly weights outwardly and lowering the piston $29^a$ to cause the oil pressure source to be connected to an oil pressure release arrangement of any suitable known type. As a result, the oil pressure of the system illustrated in FIG. 1, fed by pipes 30, 31, diminishes. Therefore, the pressure in space $11^c$ diminishes whereby spring 33 opens orifice $12^a$ through which working medium is allowed to escape from the working space. As a result, the speed of the engine is returned to normal for the new or changed load condition.

Conversely, if the load is increased and the engine speed reduced thereby the governor or oil pressure regulator 29 closes the oil pressure release so that pressure in pipes 30 and 31 is increased, opening orifice 6 to allowing additional working medium to enter the working space.

Obviously, engine speed may be varied in any suitable known manner if speed variation is desired. As seen in FIG. 2 this may also be accomplished by providing movement of the regulator cylinder relative to piston $29^a$.

The foregoing is given by way of illustration of the invention to facilitate understanding and is not intended to limit the appended claims in any sense.

What is claimed is:

1. Speed control apparatus for a hot gas reciprocating machine having means defining at least one working space having piston means driving an output shaft comprising means to supply working medium to said machine including a supply container, a compressor driven by said output shaft connected to said container and a medium supply member connecting said working space with said container, a medium outlet member connecting said working space with the suction side of said compressor, a fixed gas flow resistance means interconnecting said working space and an auxiliary medium container, a variable gas flow resistance means including a closing member interconnecting said working space with said auxiliary medium container, and speed responsive means driven by said output shaft to operate said medium supply member, said medium outlet member, and said closing member to control the speed of said machine.

2. Speed control apparatus according to claim 1 wherein said medium outlet member and said closing member are rigidly coupled to each other.

3. Speed control apparatus according to claim 1 wherein said medium supply member, medium outlet member and said closing member are hydraulically actuated.

4. Speed control apparatus according to claim 1 wherein conduit means interconnect said auxiliary container and said medium supply member including check valve means to prevent flow of medium from said auxiliary container.

5. Speed control apparatus for a hot gas reciprocating machine comprising means defining at least one working space having a thermodynamic cycle, a working medium, means to supply said working medium to each said working space, an auxiliary chamber having an open duct means of fixed flow resistance communicating with said working space and adapted to contain said working medium, and variable flow means interconnecting said working space and said auxiliary chamber whereby working medium may be withdrawn from said working space.

6. Apparatus according to claim 5 wherein said variable flow means in fully opened position has a flow rate at least five times greater than the flow rate of said open duct means.

7. Speed control apparatus according to claim 5 wherein said variable flow means communicates said working space with both said working medium supply means and said auxiliary chamber.

8. Speed control apparatus according to claim 5 wherein said variable flow means communicates said working space with both the low pressure side of a compressor driven by said machine and operatively associated with said working medium supply means and also connects said working space with said auxiliary chamber.

References Cited in the file of this patent
UNITED STATES PATENTS

| | | |
|---|---|---|
| 2,616,244 | Veldhuyzen | Nov. 4, 1952 |
| 2,746,241 | Dros et al. | May 22, 1956 |
| 2,794,315 | Meijer | June 4, 1957 |